3,778,453
1-AMINO - 4 - (4',5'-DILOWER ALKYL-3-SULPH-AMOYLPHENYLAMINO)ANTHRAQUINONE-2-SULFONIC ACIDS

Peter Hindermann, Bottmingen, and Hubert Meindl, Riehen, Switzerland, assignors to Ciba-Geigy AG, Basel, Switzerland
No Drawing. Filed Mar. 25, 1968, Ser. No. 715,990
Claims priority, application Switzerland, Apr. 5, 1967, 4,892/67
Int. Cl. C07c *143/56;* C09b *1/34*
U.S. Cl. 260—374    5 Claims

ABSTRACT OF THE DISCLOSURE

A process for producing 1-amino-4-(4',5'-di-lower alkyl-3-sulphamoyl-phenyl)-amino anthraquinones is described which affords very high yields of these novel dyestuffs free from by-products and involves the reaction of a 1-amino-4 - halogeno-anthraquinone with a 1 - amino-4,5-dialkyl-3-sulphamoyl-benzene. The novel anthraquinones which preferably bear a sulphonic acid group in 2-position at the anthraquinone nucleus are practically free from isomers having a sulphamoyl group in 2- or 6-position at the 4,5-dialkylphenylamino moiety, and dye natural and synthetic polyamide fibres in level vivid, pure blue shades of good fastness properties, especially fastness to light; the brilliance of the shade does not suffer even when observed under artificial light.

DETAILED DISCLOSURE

The present invention relates to a novel process for the production of new acid anthraquinone dyestuffs, to these dyestuffs, themselves, to processes for the dyeing and printing of organic materials, particularly of natural and synthetic polyamide fibre materials therewith, as well as to such materials dyed or printed with the aid of the new dyestuffs.

The condensation of 1 - amino-4 - halogeno-anthraquinone-2-sulphonic acid with aminobenzene sulphonic acid-N-mono-hydroxyalkylamides has been disclosed in German Pat. No. 709,689. The reaction is performed in a conventional manner in an aqueous medium in the presence of copper or copper salts and of acid binding agents, at temperatures of about 50 to 100° C. If the condensation is performed at temperatures of 80 to 100° C., then a large amount of by-products is formed in addition to the desired anthraquinone dyestuff. It is known that the proportion of these undesirable by-products can be reduced by limiting the amount of acid binding agents or by working at lower temperatures or by a combination of both of these measures. However, at temperatures below 80° C., the condensation of, for instance, 1-amino-4-bromo-anthraquinone-2-sulphonic acid with 1-amino-4-methyl-benzene-3-sulphonic acid ethanolamide, only proceeds very slowly and, when operating at a reaction temperature of 70 to 75° C. and for a reasonable reaction time of 2 to 5 hours, only small amounts of the desired anthraquinone dyestuff are formed.

It has now been found that, surprisingly, the condensation of 1-amino-4-halogeno-anthraquinone - 2 - sulphonic acid with novel lower alkyl-substituted 1 - amino-lower alkylbenzene-3-sulphonic acid amides which are distinguished from the above-mentioned 1-aminobenzene-3-sulphonic acid amides by bearing two lower alkyl groups, one in 4- and the other in 5-position at the benzene nucleus proceeds practically quantitatively under the aforesaid conditions. It is, indeed, most unexpected that such a favourable result is obtained when using the new 1-amino-4,5-di-lower alkylbenzene - 3 - sulphonic acid amides as starting materials in lieu of the known 1-amino-4-methyl-benzene-3-sulphonic acid amides in the condensation with 1-amino-4-halogeno-anthraquinone-2-sulphonic acid.

Thus, the present invention provides a process for the production of new, valuable acid anthraquinone dyestuffs of the general Formula I

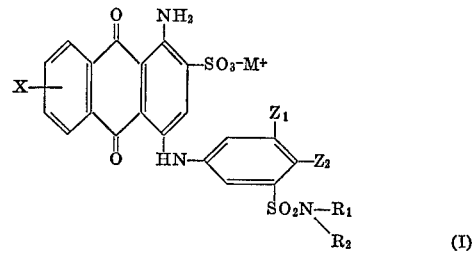

wherein

M+ represents one equivalent weight of a colourless cation,
X represents hydrogen or a monovalent substituent inert under the reaction conditions defined below,
$Z_1$ and $Z_2$ independently of each other represent identical or different lower alkyl groups,
$R_1$ represents a lower, unsubstituted or substituted alkyl group, and
$R_2$ represents hydrogen or a lower, unsubstituted or substituted alkyl group or
$R_1$ and $R_2$ together with the nitrogen atom to which they are linked can also form the radical of a 5- or 6-membered heterocyclic ring, optionally, with the inclusion of a further hetero atom as ring member in the latter, by reacting an anthraquinone compound of the general Formula II

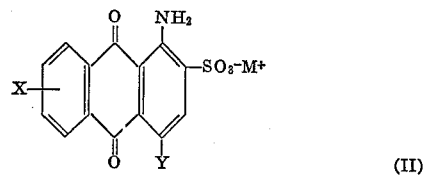

wherein

X and M+ have the meanings given in Formula I and
Y represents a halogen atom, particularly bromine, with a novel amine of the general Formula III

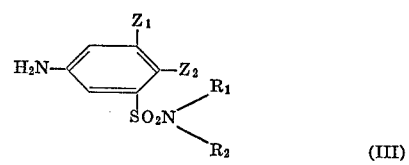

wherein $R_1$, $R_2$, $Z_1$ and $Z_2$ have the meanings given in Formula I, the reaction being performed at a temperature in the range of from 50 to 100° C. in an aqueous medium having a pH of at least 5, preferably a pH of at least 7, and in the presence of an acid-binding agent and a copper catalyst, to form an anthraquinone dyestuff of the general Formula I.

As monovalent substituent, X in the foregoing formulae represents, e.g. halogen such as chlorine or bromine, lower alkyl groups such as the methyl or ethyl group, also the sulphonic acid group. Preferably, however, X represents hydrogen.

Lower alkyl groups in the position of $Z_1$ and $Z_2$ are, e.g. the methyl, ethyl, n- or isopropyl group. Preferably each of $Z_1$ and $Z_2$ represents the methyl group.

As lower, unsubstituted alkyl groups, $R_1$ and $R_2$ represent, e.g. the metyhl, ethyl or isopropyl group; as lower substituted alkyl groups, advantageously they represent an alkyl group substituted by hydroxyl such as the β-hydroxyethyl or γ-hydroxypropyl group; however, they can also represent an alkyl group substituted by a lower alkoxy, hydroxy-lower alkoxy or lower alkoxy-lower alkoxy group, e.g. the γ-methoxypropyl, β-hydroxy-ethoxyethyl or β-methoxyethoxyethyl group. If $R_1$ and $R_2$ together with the nitrogen atom to which they are linked, form a 6-membered heterocyclic ring, optionally with the inclusion of another hetero atom in the latter, then this is, e.g. the piperidide or morpholide group. Preferably, however, $R_1$ is a hydroxyalkyl group, particularly the β-hydroxy ethyl group, and $R_2$ is hydrogen.

Chlorine and, particularly, bromine are suitable as halogen atoms in the position of Y.

The starting materials of Formula II are known. The following are given as examples of particularly suitable starting materials: 1-amino-4-bromoanthraquinone-2-sulphonic acid, 1-amino-4-bromoanthraquinone-2,5-, -2,6- and -2,8-disulphonic acid, 1-amino-4-bromo-7-chloroanthraquinone-2-sulphonic acid, 1-amino-4,6-dichloro- or 1-amino-4,6-dibromo-anthraquinone-2-sulphonic acid.

The novel 1-amino-4,5-di-lower alkylbenzene-3-sulphonic acid amides of Formula III which are suitable as starting materials in the process of the invention are obtained, for example, by nitrating a 1,2-lower alkylbenzene, isolating the 1-nitro-4,5-di-lower alkylbenzene in a conventional manner from the mixture of isomers formed, converting it with chlorosulphonic acid into the corresponding 1-nitro-4,5-di-lower alkylbenzene-3-sulphonic acid chloride and then reacting the latter with an amine of Formulae IV

(IV)

wherein $R_1$ and $R_2$ have the meanings given in Formula I, to form the corresponding 1-nitro-4,5-di-lower alkyl-3-sulphonic acid amide and thereafter reducing the nitro group to the amino group.

The following are mentioned as particularly suitable 1-amino-4,5-di-lower alkylbenzene-3-sulphonic acid amides falling under Formula III:

1-amino-4,5-dimethylbenzene-3-sulphonic acid ethanolamide,
1-amino-4,5-dimethylbenzene-3-sulphonic acid-N,N-di-(β-hydroxylethyl)-amide,
1-amino-4,5-dimethylbenzene-3-sulphonic acid-N-methyl-N-β-hydroxyethylamide,
1-amino-4,5-dimethylbenzene-3-sulphonic acid N-γ-methoxyproplyamide,
1-amino-4,5-dimethylbenzene-3-sulphonic acid-N-(methoxyethoxy-ethylamide),
1-amino-4,5-dimethylbenzene-3-sulphonic acid-N,N-dimethylamide,
1-amino-4,5-dimethylbenzene-3-sulphonic aicd-N-methylamide,
1-amino-4,5-dimethylbenzene-3-sulphonic acid-N-β-hydroxyethyl-N-ethylamide,
1-amino-4,5-dimethylbenzene-3-sulphonic acid morpholide,
1-amino-4,5-diethylbenzene-3-sulphonic acid morpholide, and
1-amino-4,5-di-isopropylbenzene-3-sulphonic acid ethanolamide.

The starting compounds of Formulae II and III are advantageously used in a molar ratio in the range of from about 1:1.05 to 1:1.5, i.e. an excess of the compound of Formula III is recommended.

The condensation of an anthraquinone compound of Formula II with an amine of Formula III is advantageously performed at temperatures between 60 to 100° C., more preferably at 70 to 85° C., and optimally at 70 to 75° C., in water or aqueous-organic solution and in the presence of a copper catalyst and an acid binding agent. It proceeds smoothly, produces a very high yield without formation of undesirable by-products and is practically complete after 2 to 4 hours' reaction time.

Particularly suitable copper catalysts are, e.g. metallic copper or copper salts, preferably cuprous salts such as cuprous chloride, bromide, iodide, acetate, sulphate, or cuprous oxide. Preferably, metallic copper powder is used. Also mixtures e.g. of cuprous chloride and metallic copper powder have proved to be very advantageous. The catalysts need only be added in small amounts.

Examples of acid binding agents which can be used are alkali metal bicarbonates or carbonates such as lithium, sodium and potassium bicarbonate or carbonate, or alkali metal phosphates. Preferably, sodium bicarbonate is used as such agent.

The acid anthraquinone dyestuffs to Formula I are preferably isolated as alkali metal salts, in particular as sodium salts.

The new acid anthraquinone dyestuffs are suitable for the dyeing and printing of organic materials, particularly of natural and synthetic polyamide fibre material, principally wool but also nylon or polyurethane fibres. At higher temperatures, the new dyestuffs draw evenly from a weakly acid to acid bath and have good levelling and migration properties. The dyeings so obtained are distinguished by vivid, pure blue shades which have very good fastness properties, particularly they have excellent fastness to light. Compared with the anthraquinone dyestuffs disclosed in German Pat. No. 709,689 which contain a single methyl group in 4-position at the phenylamino moiety, they are distinguished, in addition, by their better constancy of colour in artificial light and also, without exception, by somewhat better wet fastness properties.

It is well known that dyed fabrics especialy of polyamide fibres appear in different shades depending on whether they are viewed in broad daylight, and especially in sun-light, on the one hand, or in weaker light, especially in artificial, e.g. electric light, on the other hand. The shade which these fabrics show under the latter type of illumination is also referred to as "evening shade," while the shade in which the fabrics appear in daylight, may be referred to as "normal shade." It can thus happen that a fabric having a brilliant blue "normal shade" has a dull, red-tinged blue evening shade. It is therefore desirable that the difference between normal shade and evening shade be as small as possible. Hence, constancy of shade under different types of illumination is an important advantage.

The following examples illustrate the invention. The temperatures are given in degrees centigrade.

Example 1

50.6 g. of the sodium salt of 1-amino-4-bromoanthraquinone-2,6-disulphonic acid, 29.5 g. of 1-amino-4,5-dimethylbenzene-3-sulphonic acid ethanolamide and 20 g. of sodium bicarbonate are added to 300 ml. of water. The mixture is heated to a temperature of 80 to 85° and, while stirring well at this temperature, 0.5 g. of copper powder are added in small batches within 30 minutes. To complete the formation of the dyestuff, the reaction mixture is stirred for another 3 hours at 80 to 85°, whereupon the dyestuff formed is precipitated by adding sodium chloride to the reaction solution. The precipitate is separated by filtration, washed with aqueous 15% sodium chloride solution and dried. The sodium salt of the dyestuff corresponds to the formula

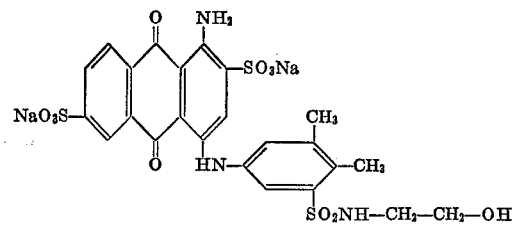

and is a dark blue powder which dissolves in concentrated sulphuric acid with a cloudy green-blue shade and in water with a pure green-blue shade. The dyestuff dyes wool and synthetic polyamide fibres from a dyebath acidified with acetic acid, formic acid or sulphuric acid in level greenish blue shades which have very good fastness to light.

The 1-amino-4,5-dimethylbenzene-3-sulphonic acid ethanolamide used (M.P. 123.5–124°) is produced as follows: 1-nitro-4,5-dimethylbenzene is dissolved in chlorosulphonic acid and the solution is stirred for 8 hours at 100 to 110°. It is then cooled to room temperature and, while stirring vigorously, it is poured into a mixture of ice and water. The precipitated 1-nitro-4,5-dimethylbenzene-3-sulphonic acid chloride is filtered off and washed with water until the washing water is neutral. The crude sulphochloride can be purified by crystallisation from petroleum ether and then melts at 100 to 101°. The recrystallised sulphochloride is then reacted in aqueous suspension with ethanolamine at 50 to 60°, the pH being kept constant at 7 to 7.5, to form the corresponding 1-nitro-4,5-dimethylbenzene-3-sulphonic acid ethanolamide which precipitates in very high yield and great purity from the reaction mixture. Recrystallised from alcohol, 1-nitro-4,5-dimethylbenzene-3-sulphonic acid ethanolamide melts at 114.5 to 115.5°. This nitro compound is then reduced to the corresponding amine according to Béchamps. The yield thereof is quantitative for all practical purposes.

When repeating Example 1 as a comparison, with 29.5 g. of 1-amino-2,6-dimethylbenzene - 3 - sulphonic acid ethanolamide in lieu of 1-amino-4,5-dimethylbenzene-3-sulphonic acid ethanolamide, thin layer chromatography of the reaction mixture after the latter has been stirred for 60 minutes following the addition of copper powder shows no formation at all of blue anthraquinone dyestuff, while most of the blue dyestuff has been formed when using the last-mentioned amine as described in Example 1.

By repeating the above example, but using instead of 50.6 g. of the sodium salt of 1-amino-4-bromo-anthraquinone-2,6-disulphonic acid an equivalent amount of the corresponding 4-chloro derivative and otherwise following the procedure given in the example, the same blue dyestuff is obtained.

Example 2

(a) 40.4 g. of the sodium salt of 1-amino-4-bromo-anthraquinone 2-sulphonic acid are slurried in 300 ml. of water. 37.44 g. of 1-amino-4,5-dimethylbenzene-3-sulphonic acid-N,N-di-(β-hydroxyethyl)-amide (as viscous oil) and 20 g. of sodium bicarbonate are added to this suspension and the reaction mixture is heated to 75 to 80°. While stirring vigorously at this temperature, a homogeneous mixture consisting of 0.25 g. of copper powder and 0.25 g. of copper-(I) chloride is added within 45 minutes. To complete the formation of the dyestuff, the whole is stirred for another 4 hours at 75 to 80°, the reaction mixture is then cooled to room temperature, acidified with dilute hydrochloric acid until a dropped sample turns congo red paper blue and then the precipitated dye acid of the formula

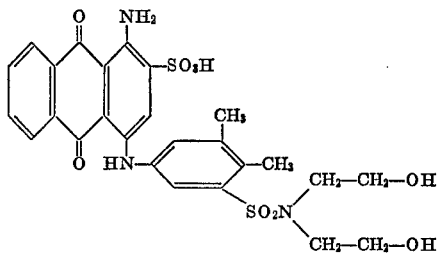

is filtered off and the residue is washed with dilute hydrochloric acid. The dye acid is then slurried in 300 ml. of water and is dissolved at a neutral reaction by the dropwise addition of dilute aqueous sodium hydroxide solution. It is precipitated in the form of the sodium salt by adding sodium chloride to the solution, filtered off, washed and dried. The sodium salt so obtained is a dark blue powder which dissolves in concentrated sulphuric acid with a greenish blue and in water with a pure blue colour. The dyestuff dyes wool and synthetic polyamide fibres from an acetic acid or sulphuric acid bath in level, pure blue shades which have excellent fastness to light.

(b) By repeating the above example, but using instead of 37.44 g. of 1-amino-4,5-dimethylbenzene-3-sulphonic acid-N,N-di(β-hydroxyethyl)-amide, 33.54 g. of 1-amino-4,5 - dimethylbenzene-3-sulphonic acid-N-methyl-N-β-hydroxyethyl-amide (M.P. 99–100°) and otherwise following the procedure given in the example, a blue dyestuff having similar properties as that of Example 2(a) is obtained.

Example 3

(a) 40.4 g. of the sodium salt of 1-amino-4-bromo-anthraquinone-2-sulphonic acid, 38.08 g. of 1-amino-4,5-dimethylbenzene - 3 - sulphonic acid-N-γ-methoxypropyl-amide (M.P. 75°) and 20 g. of sodium bicarbonate are added to 350 ml. of water and the reaction mixture is heated to 80 to 85°. While stirring well, 0.6 g. of copper-(I) chloride are added in portions within 10 minutes. Dyestuff formation occurs immediately; it is completed by heating for another 2 hours at 80 to 85°. The dyestuff formed of the formula

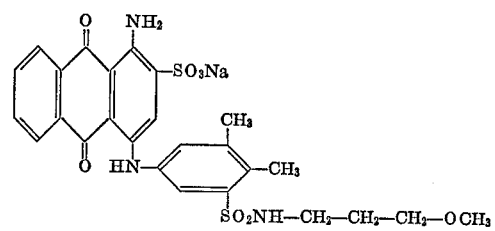

is precipitated from the solution in the form of the sodium salt by the addition of sodium chloride and is filtered off and dried. It is a dark powder which dissolves in concentrated sulphuric acid with a greenish blue and in water with a pure blue shade. The dyestuff dyes wool and synthetic polyamide fabric from an aqueous dyebath acidified with acetic acid or sulphuric acid in level, non-skittery, blue shades which have very good fastness to light.

(b) A dyestuff having similar properties is obtained by using, instead of the 38.08 g. of 1-amino-4,5-dimethylbenzene - 3 - sulphonic acid - N - γ-methoxypropylamide, 42.28 g. of 1-amino - 4,5 - dimethylbenzene-3-sulphonic acid-N-(β-methoxyethoxy-ethylamide) and otherwise following the procedure given in Example 3.

Example 4

(a) 40.4 g. of the sodium salt of 1-amino-4-bromo-anthraquinone-2-sulphonic acid are slurried at 60 to 65° in 300 ml. of water. 26.84 g. of 1-amino-4,5-dimethylbenzene-3-sulphonic acid ethanolamide are added and the temperature of the mixture is raised to 70 to 75°. At this temperature, 20 g. of sodium bicarbonate are added and, while stirring well, 0.5 g. of copper-(I) chloride are added within 15 minutes. On continuing stirring at 70 to 75°, the blue dyestuff formed gradually precipitates in the form of the shimmering, pure sodium salt. After stirring for 3 hours the dyestuff of the formula

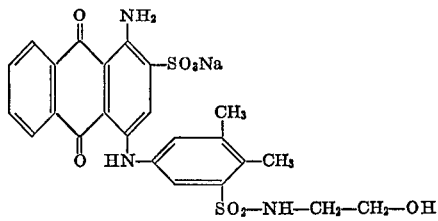

is precipitated at 60° in the form of the sodium salt by the addition of sodium chloride. It is filtered, washed with 5% aqueous sodium chloride solution and dried. It is a dark blue dyestuff powder which dissolves in concentrated sulphuric acid with a greenish blue and in water with a clear blue colour. The yield is quantitative for all practical purposes. The dyestuff dyes wool and synthetic polyamide fibres as well as mixed fabrics made of the two fibres mentioned from an aqueous dyebath acidified with acetic acid or sulphuric acid in pure blue shades. The dyeings have very good fastness to light and good colour in artificial light.

(b) By using instead of 26.84 g. of 1-amino-4,5-dimethylbenzene-3-sulphonic acid ethanolamide, 31.68 g. of 1 - amino - 4,5 - dimethylbenzene-3-sulphonic acid-N-hydroxyethylamide and otherwise following the procedure given in Example 4, a blue dyestuff having similar properties as that of Example 4(a) is obtained.

(c) A blue dyestuff having similar properties as that of Example 4(a) is also obtained by repeating the above example, but replacing the 40.4 g. of sodium salt of 1 - amino - 4 - bromoanthraquinone-3-sulphonic acid used therein by 43.85 g. of sodium salt of 1-amino-4-bromo-7-chloro-anthraquinone-2-sulphonic acid and otherwise following the procedure given in the example.

Example 5

(a) 40.4 g. of the sodium salt of 1-amino-4-bromoanthraquinone-2-sulphonic acid, 37.2 g. of 1-amino-4,5-dimethylbenzene - 3 - sulphonic acid-N,N-dimethylamide (M.P. 131.5–132.5°) and 20 g. of sodium bicarbonate are added to 400 ml. of water. The reaction mixture is heated to 80–85° and, while stirring well, 0.5 g. of copper-(I) bromide are added in portions within 30 minutes. Dyestuff formation begins immediately and is completed by stirring for another 4 hours at 80 to 85°. The dyestuff formed of the formula

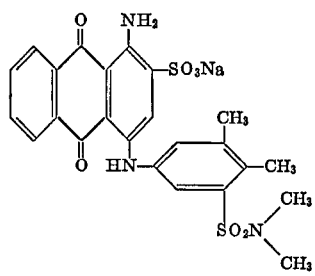

is precipitated at 40° in the form of the sodium salt by the addition of sodium chloride, filtered off and dried. It is a dark blue powder which dissolves in concentrated sulphuric acid with a greenish blue and in water with a pure blue shade. The dyestuff dyes wool and synthetic polyamide fibres from an acetic acid or sulphuric acid bath in pure blue shades which have very good fastness to light and good constancy of colour in artificial light.

(b) By using instead of 37.2 g. of 1-amino-4,5-dimethylbenzene-3-sulphonic acid-N,N-dimethylamide, 32.1 g. of 1-amino-4,5-dimethylbenzene-3-sulphonic acid-N-methylamide or 44.2 g. of 1-amino-4,5-dimethylbenzene-3-sulphonic acid-N-ethyl-N-isopropyl-amide and otherwise repeating the procedure as given in Example 5(a), blue dyestuffs having similar properties are obtained.

Example 6

(a) An aqueous slurry is prepared from 40.4 g. of the sodium salt of 1-amino-4-bromoanthraquinone-2-sulphonic acid, 32.4 g. of 1-amino-4,5-dimethylbenzene-3-sulphonic acid morpholide (M.P. 146.5–147.5°) and 20 g. of sodium bicarbonate in 400 ml. of water. At a reaction temperature of 70 to 75°, 0.6 g. of copper powder are added in portions within 1 hour and the dyestuff formation is completed by further stirring for 5 hours at 70 to 75°. The sodium salt of the dyestuff formed of the formula

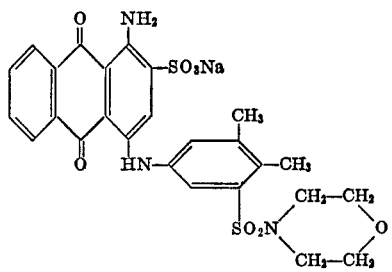

is precipitated at room temperature by the addition of sodium chloride, filtered off, washed with 10% aqueous sodium chloride solution and dried. It is a dark blue powder. The dyestuff dyes wool and synthetic polyamide fibres from an acetic acid or sulphuric acid bath in pure, level shades having good overall fastness properties.

(b) By using instead of the 32.4 g. of 1-amino-4,5-dimethylbenzene-3-sulphonic acid morpholide, 35.76 g. of 1-amino-4,5-diethylbenzene-3-sulphonic acid morpholide and otherwise following the procedure given in Example 6(a), a blue dyestuff having similar dyeing properties is obtained.

Example 7

(a) 53.82 g. of a mixture of 1-amino-4-bromoanthraquinone-2,5- or -2,8-disulphonic acid potassium salt, 29.5 g. of 1-amino-4,5-dimethylbenzene-3-sulphonic acid ethanolamide and 23 g. of potassium bicarbonate are slurried in 300 ml. of water. The reaction mixture is heated to 80 to 85° and 0.5 g. of copper-(I) chloride are added within 20 minutes. The dyestuff formation is complete after stirring for another 3 hours at 80 to 85°. The potassium salt of the dyestuff of the formula

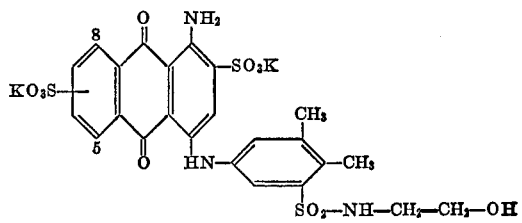

is precipitated at room temperature by the addition of potassium chloride, filtered off and dried. When isolated, the yield of dyestuff is quantitative for all practical purposes. It is a dark blue dyestuff powder which dissolves in concentrated sulphuric acid with a greenish violet and in water with a blue colour. The dyestuff dyes wool from an aqueous sulphuric acid bath in level blue shades which have good light fastness and good constancy of colour in artificial light.

(b) A dyestuff having similar properties as that of Example 7(a) is obtained by using instead of 29.5 g. of 1 - amino - 4,5-dimethylbenzene-3-sulphonic acid ethanolamide, 36 g. of 1-amino-4,5-diisopropylbenzene-3-sulphonic acid ethanolamide and otherwise following the same procedure as given in Example 7(a).

Example 8

10 g. of wool flannel are introduced into a 40° warm bath containing 0.5 g. of sodium sulphate, 0.4 ml. of 40% acetic acid and 0.2 of dyestuff according to Example 4 in 500 ml. of water. The temperature is evenly raised to the boil within 30 minutes and the flannel is dyed at the boil for 1 hour. The dyed goods are then rinsed first with warm and then with cold water and dried at 60°. A very level, pure blue and light fast dyeing having very good constancy of colour in artificial light is obtained.

By using instead of acetic acid 0.1 ml. of 85% formic acid or 0.1 ml. of 96% sulphuric acid and following the dyeing procedure as described in the above example, a blue dyeing having the same properties is obtained.

By using instead of 10 g. of wool flannel 10 g. of nylon-6 fabric and proceeding as described above, a very level pure and light fast blue dyeing having very good constancy of colour in artificial light, is obtained.

What we claim is:

1. A dyestuff of the formula

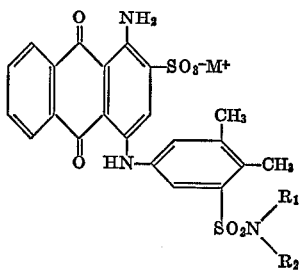

wherein $M^+$ represents a sodium or potassium cation, $R_1$ represents a member selected from the group consisting of methyl, ethyl, isopropyl, β-hydroxyethyl, γ-hydroxypropyl, γ-methoxypropyl, β-hydroxyethoxyethyl and β-methoxyethoxyethyl and $R_2$ represents a hydrogen atom or a member selected from the group consisting of methyl, ethyl, isopropyl and β-hydroxyethyl.

2. A dyestuff as defined in claim 1, which is of the formula

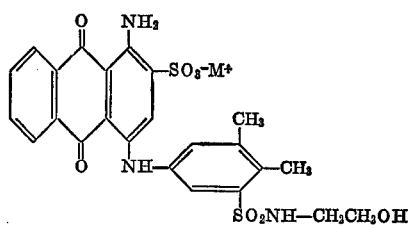

3. A dyestuff as defined in claim 1, which is of the formula

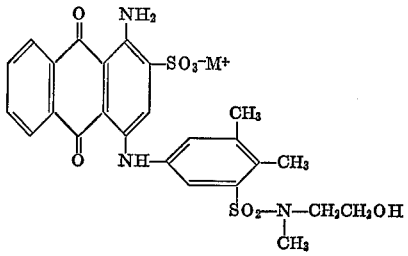

4. A dyestuff as defined in claim 1, which is of the formula

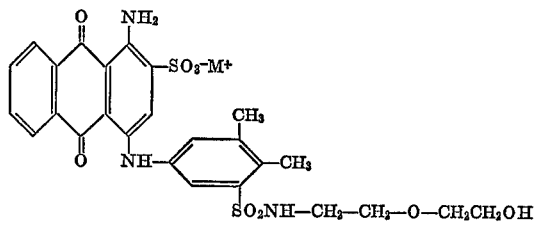

5. A dyestuff as defined in claim 1, which is of the formula

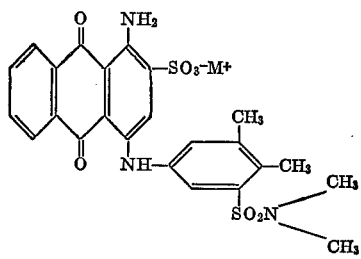

References Cited

UNITED STATES PATENTS 2,029,258    1/1936    Diefenbach _____ 260—374

FOREIGN PATENTS 709,689    8/1941    Germany.

ALEX MAZEL, Primary Examiner

B. DENTZ, Assistant Examiner

U.S. Cl. X.R.

260—247.1, 293.62, 556 B, 326.5 SF, 243 B, 268 S